United States Patent
Lu et al.

(10) Patent No.: US 9,014,187 B2
(45) Date of Patent: Apr. 21, 2015

(54) MANAGING STALE ROUTE REMOVAL IN A ROUTING INFORMATION BASE OF A NETWORK ELEMENT

(75) Inventors: Wenhu Lu, San Jose, CA (US); Alfred C. Lindem, III, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 898 days.

(21) Appl. No.: 12/966,895

(22) Filed: Dec. 13, 2010

(65) Prior Publication Data
US 2012/0147888 A1 Jun. 14, 2012

(51) Int. Cl.
*H04L 12/28* (2006.01)
*H04L 12/56* (2006.01)
*H04L 12/751* (2013.01)
*H04L 12/741* (2013.01)

(52) U.S. Cl.
CPC ............. *H04L 45/02* (2013.01); *H04L 45/54* (2013.01)

(58) Field of Classification Search
CPC ... H04L 45/16; H04L 41/5032; H04L 45/124; H04W 8/26
USPC .................................. 370/218, 389, 392, 400
See application file for complete search history.

(56) References Cited

U.S. PATENT DOCUMENTS

2004/0006640 A1* 1/2004 Inderieden et al. ........... 709/242
2008/0031239 A1* 2/2008 Kapoor et al. ................ 370/389

FOREIGN PATENT DOCUMENTS

WO  WO 2006/014710 A2  2/2006
WO  WO 2007/117886 A2  10/2007

* cited by examiner

*Primary Examiner* — Andrew Chriss
*Assistant Examiner* — Romani Ohri

(57) ABSTRACT

A network element of a communications network includes a fresh route queue, a stale route queue, a Routing Information Base (RIB), a network interface, and a routing protocol module. The network interface receives link state information from other network elements. The routing protocol module determines a plurality of routes from the link state information. The routing protocol module identifies among the plurality of routes a subset of routes that are present in the stale route queue, adds the subset of routes to the fresh route queue, and deletes the subset of routes from the stale route queue. The routing protocol module then remove routes in the RIB that correspond to any routes remaining in the stale route queue, and moves the routes from the fresh route queue to the stale route queue. Related methods for managing routes in a RIB of a network element are disclosed.

20 Claims, 7 Drawing Sheets

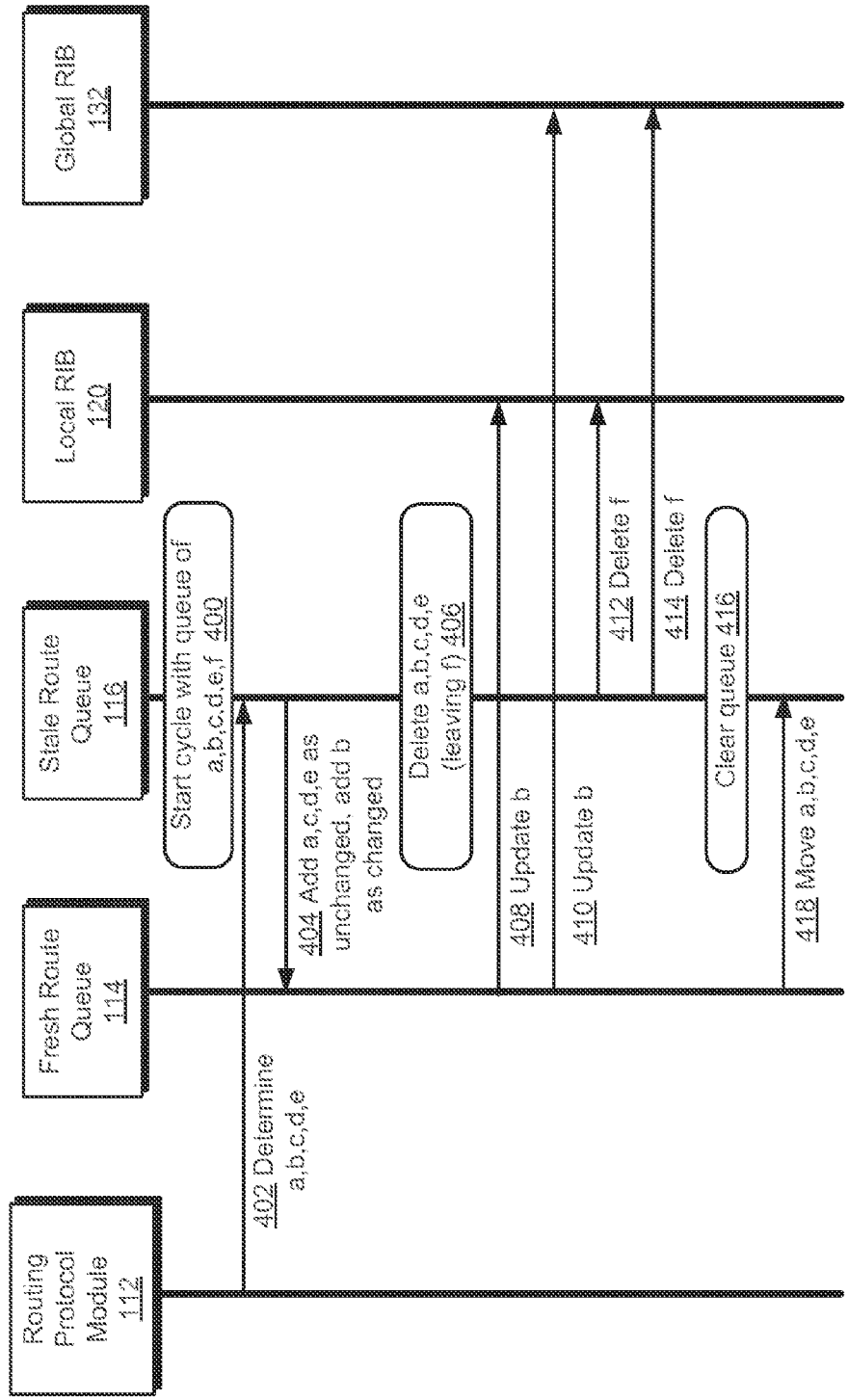

MANAGING STALE ROUTE REMOVAL IN A ROUTING INFORMATION BASE OF A NETWORK ELEMENT

TECHNICAL FIELD

The present disclosure is directed to network communications and, more particularly, to managing routing information in network elements of a communications network.

BACKGROUND

Network elements that forward packets in packet-switched networks typically separate their forwarding services (e.g. the tasks of moving packets from one network interface to another) from their routing services (e.g. the tasks of determining the best path through the network). For example, a network element, such as a router, typically receives a packet at one of its network interfaces and forwards the packet to another of its network interfaces. In making the decision to which network interface to forward the packet, the network element typically uses information included in the header of the packet, as well as routing information (also referred to as "routes") stored and managed by the network element.

The routing information managed by a network element includes information about the connectivity between the nodes of the network in which the network element is established, and information about the connectivity to nodes in other networks.

For example, the routing information may include the routes to the network destinations that are reachable from the network element. A route includes an address destination, which is usually represented by an address prefix (also referred to as prefix), and information that describe the path to the address destination. The address prefix may be expressed as a combination of a network address and a mask that indicates how many bits of the address are used to identify the network portion of the address. The information that describes the path to the address destination may include, for example, the address of a node that is the next hop to the address destination, the list of Autonomous Systems (ASs) that must be traversed in order to reach the address destination, and the network address of the node that originated the route.

The routing information managed by a network element may also include information that indicates the type of each network interface of the network element, the network node or nodes that are connected to the network element over each network interface, and various other parameters that may be associated with the network element or its network interfaces.

A network element that separates its forwarding service from its routing service typically stores all of its routing information in a Routing Information Base (RIB). Each routing protocol that executes on the network element selects its own set of best routes, and installs those routes and their attributes in the RIB. Within a routing protocol, the routes are selected based on one or more criteria, or metrics, used by that protocol. A RIB process periodically traverses the routes in the RIB and selects the best overall route to each address destination by comparing the attributes of all routes to that destination. The routes identified in the RIB as best routes are then transferred, or downloaded, to one or more Forwarding Information Bases (FIBs) that are used for forwarding packets by the one or more network interfaces of the network element. Thus, at any given point in time a FIB maintains an image of all or a subset of the routing information contained in the RIB. When routing or topology changes occur in the network, the routing information in the RIB is updated and the changes to the routing information are reflected in the one or more FIBs.

Network elements may store the routing information in the RIB as one or more logically or physically separate routing tables to facilitate orderly management of different services. For example, a network element that supports Virtual Private Network (VPN) features usually manages the routes of different VPNs in separate logical or physical routing tables. In another example, a network element may manage routes for different topologies, such as, for example, topologies associated with a different Quality of Service (QoS), in separate routing tables. Further, a plurality of network elements may execute as a virtual router, and each network element in the virtual router may store the RIBs of the other network elements of the virtual router in logically or physically separate routing tables.

Routes that are no longer reachable or viable (stale) need to be removed from the various RIBs and the FIB. Because routing processes update only the reachable routes, not the stale routes, the stale routes are discovered by separate burdensome processes. For example, after all active routes have been computed and stored in an updated routing table, each route entry in the updated routing table cars be compared to each entry in the old routing table to identify new routes, changed routes, unchanged routes, and stale routes. Stale routes are routes that exist in the old routing table and not in the updated routing table.

Comparing every route in the updated routing table and old routing table can create a significant burden on the computational resources of the network element and can be especially wasteful when only a few routes have become stale from one routing computation cycle to another.

SUMMARY

Some embodiments of the present invention are directed to a method for managing routes in a Renting Information Base (RIB) of a network element. A plurality of routes are determined from link state Information received at the network element. A subset of routes are identified among the plurality of routes that are present in a stale route queue. The subset of routes are added to a fresh route queue. The subset of routes are deleted from the stale route queue. Routes in the RIB that correspond to any routes remaining in the stale route queue are then removed. Routes are then moved from the fresh route queue to the stale route queue.

In some further embodiments, the RIB can include a local RIB and global RIB. The local RIB can store routes that are generated by a single routing protocol module. The global RIB can store routes generated by a plurality of routing protocol modules. When removing routes in the RIB that correspond to any routes remaining in the stale route queue, the routes in the local RIB and the routes in the global RIB that correspond to any routes remaining in the stale route queue can be removed after the deletion of the subset of routes.

In some further embodiments, the fresh route queue can include a fresh-changed queue and a fresh-unchanged queue. New routes are identified as any of the plurality of routes determined from the link state information that are not present in the stale route queue. The identified new routes are added to the fresh-changed queue. Changed routes are identified as any of the plurality of routes determined from the link state information that are different from corresponding routes in the stale route queue. The identified, changed routes are added to the fresh-changed queue. Unchanged routes are identified as any of the plurality of routes determined from the link state information that are the same as corresponding routes in the stale route queue. The identified unchanged routes are added to the fresh-unchanged, queue. The identified new routes and the identified changed routes from the fresh-changed queue are added to the RIB.

Some other embodiments are directed to a network element of a communications network. The network element includes a fresh route queue, a stale route queue, a RIB, a network interface, and a routing protocol module. The network interface is configured to receive link state information from other network elements. The routing protocol module determines a plurality of routes from the link state information. The routing protocol module identifies among the plurality of routes a subset of routes that are present in the stale route queue, adds the subset of routes to the fresh route queue, and deletes the subset of routes from the stale route queue. The routing protocol module then remove routes in the RIB that correspond to any routes remaining in the stale route queue, and moves the routes from the fresh route queue to the stale route queue.

BRIEF DESCRIPTION OF THE DRAWINGS

The accompanying drawings, which are incorporated in and constitute a part of this specification, illustrate various embodiments of the invention. In the drawings:

FIGS. 3a and 3b illustrate an example old routing table and new routing table, respectively;

FIG. 4 illustrates a diagram of operations and associated information flows that may be performed by the network node of FIG. 1 to manage routes in a local RIB and a global RIB according to some embodiments;

DETAILED DESCRIPTION

The following detailed description of the invention refers to the accompanying drawings. The same reference numbers in different drawings may identify the same or similar elements. Also, the following detailed description does not limit the invention.

Figure 1:
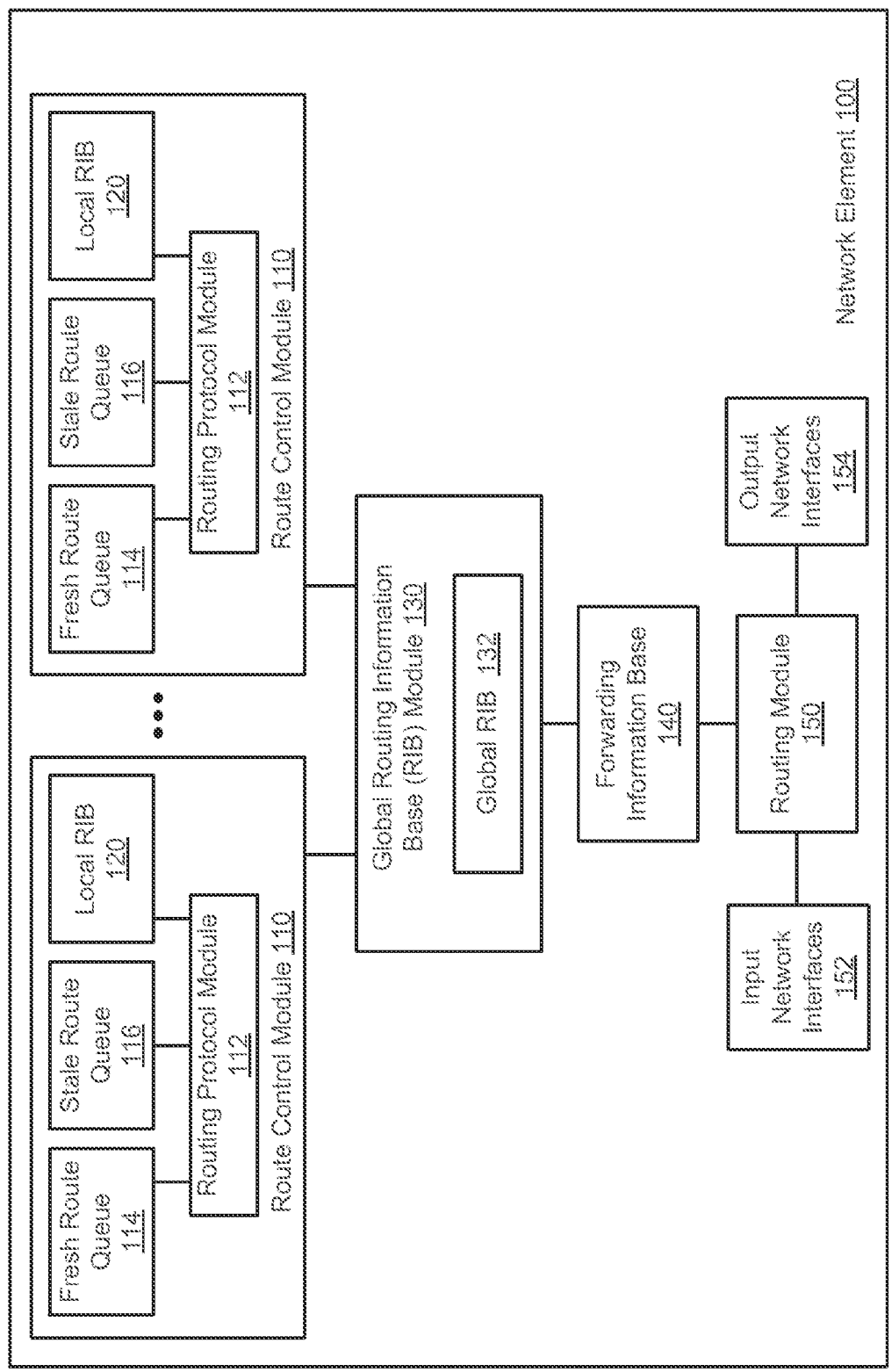
FIG. 1 illustrates an network element that is configured according to some embodiments.

FIG. 1 illustrates a network element 100 that determines routes through other network elements of a communications network and receives and forwards packets through those network elements. The network element 100 may, for example, be a router or route server a packet switched network. The network element 100 includes a plurality of route control modules 110, a global RIB module 130 with a global RIB 132, a forwarding information base (FIB) 140, a routing module 150, input network interfaces 152, and output network Interfaces 154.

The route control modules 110 are configured to receive routing information from peer (reachable) network nodes, and to determine routes using with various routing protocols. In accordance with some embodiments, the route control modules 110 each include a routing protocol module 112, a fresh route queue 114, a stale route queue 116, and a local RIB 120. The routing protocol module 112 may include a Border Gateway Protocol (BGP) process and an Internal Gateway Protocol (IGP) process.

The BGP process is configured to receive and maintain routing information in conformance with the BGP routing protocol. BGP is a peer-to-peer Exterior Gateway Protocol (EGP) that is used to exchange routing information among network elements (usually routers) in the same or different autonomous systems. In operation, the BGP process receives routes in BGP messages that are sent to the network element 100 from other BGP peers.

The IGP process is configured to apply one or more route selection and/or route configuration algorithms to the received routes. For example, the IGP process may determines routes in conformance with an IGP protocol, such as, an Open Shortest Path First (OSPF) protocol, an Intermediate System-to-Intermediate System (IS-IS) protocol, a Routing Information Protocol (RIP), and an Interior Gateway Routing Protocol (IGRP). Each of the route control modules 120 may have a routing protocol module 112 that operates according to a different IGP protocol. Thus, the local RIB 120 of one route control module 110 can have routes that are determined using a different IGP protocol than the local RIB 120 of another route control module 110.

The global RIB module 130 forms a central repository of the routes contained in the local RIBs 120 of each of the route control modules 110. The global FIB module 130 receives routes contained hi the local RIB 120 of each route control module 110, and stores those routes in the global RIB 132. Accordingly, each of the local RIBs 120 contains routes that are determined by a single routing protocol module 110 using a single BGP/IGP protocol. In contrast, the global RIB contains routes that are determined by a plurality of routing protocol modules using different BGP/IGP protocols.

For example, the local RIB 120 of one of the route control modules 110 may contain routes that are determined using the OSPF protocol, and the local RIB 120 of another one of the route control modules 110 may contain routes that are determined using the IS-IS protocol. The global RIB 132 would then contain routes from both of the local RIBs 120.

The FIB 140 accesses the global RIB 132 to obtain routes that are used by the routing module 150 to forward packets. More particularly, the routing module 150 generates routing header information using the routes obtained by the FIB 140, and adds the generated routing header information to packets that are forwarded through output network interfaces 154.

Figure 2:
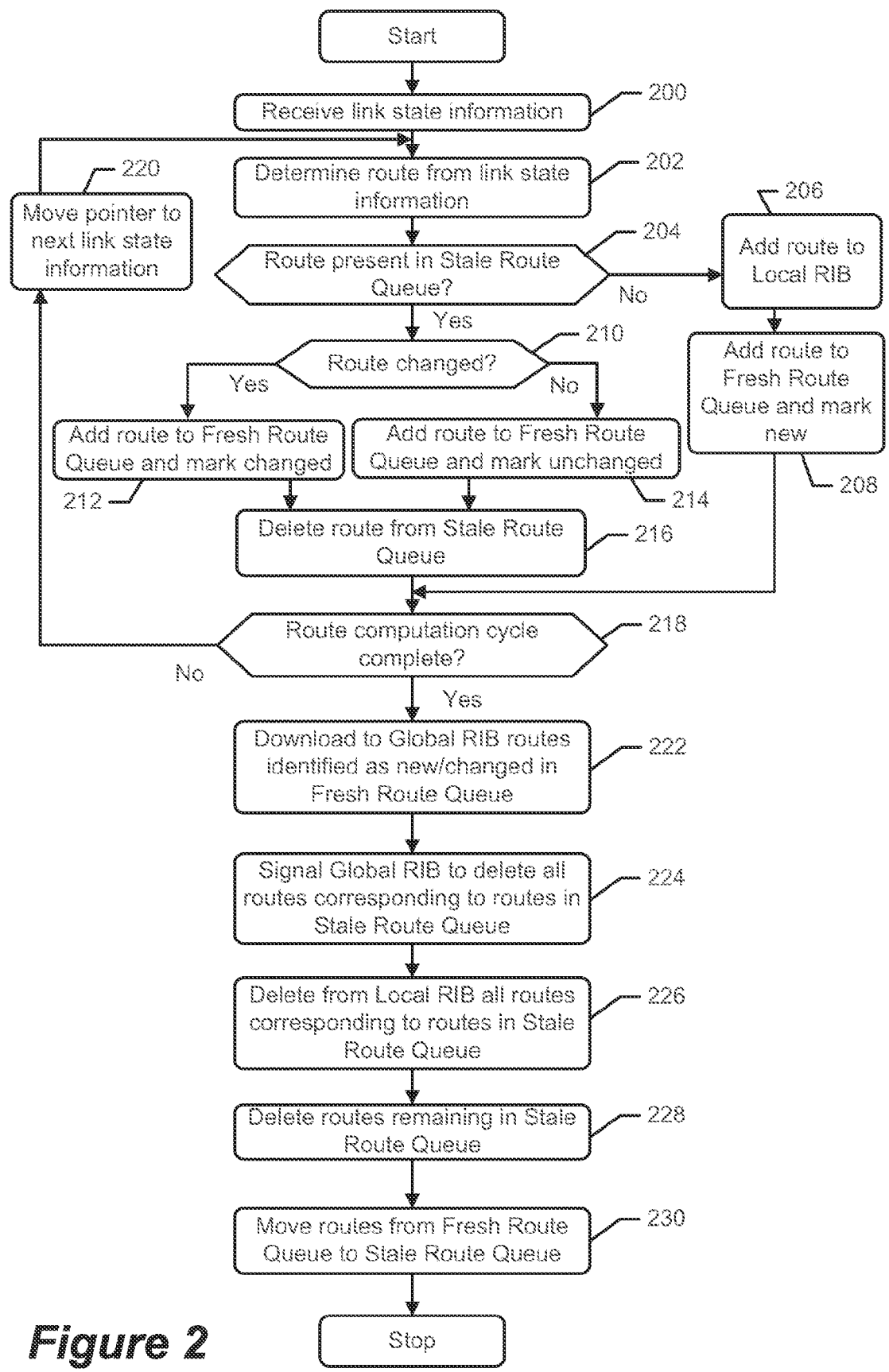
FIG. 2 illustrates a flowchart of operations and methods that may be performed by the network node of FIG. 1 to manage routes in a local RIB and a global RIB according to some embodiments.

FIG. 2 illustrates a flowchart of operations and methods that may be performed by the network node 100 of FIG. 1 to manage routes in the local RIB 120 and the global RIB 132 according to some embodiments. Referring to FIG. 2, the routing protocol module 112 receives (block 200) link state information from peer network elements 100. The routing protocol module 112 determines (block 202) a route from the link state information. The stale route queue 116 initially contains all routes that were determined from a previous route computation cycle.

A determination is made (block 204) as to whether the route is in the stale route queue 116 and, if not, the routing protocol module 112 adds (block 206) the route to the local RIB 120. The route is also added (block 208) to the fresh route queue 114 and is marked therein as a new route.

When the route is determined (block 204) to be in the stale route queue 116, a further determination (block 210) is made as to whether the route has changed. When it has changed relative to the stale route queue 116, the route is added (block 212) to the fresh route queue 114 and is marked therein as changed. In contrast, when the route has not changed, the route is added (block 214) to the fresh route queue 114 and is marked therein as unchanged.

The route is then deleted (block 216) from the stale route queue 116. A determination (block 218) is made as to whether the route computation cycle is complete (e.g. all routes computed from the link state information) and, if not, a pointer is moved (block 220) to the next link state information element and the cycle is repeated through blocks 202-216 as described above.

When the route computation cycle is complete, all of the routes that are identified as new and changed in the fresh route queue 114 are downloaded (block 222) to the global RIB 132 via the global RIB module 130. In some embodiments, the routes that are to be downloaded to the global RIB 132 are given relative priorities according to defined rules/policies. The fresh route queue 114 may be segmented into separate storage areas and the routes may be selectively stored in respective ones of the storage areas of the queue 114 based on their priority. The routes may then be downloaded to the global RIB 132 from the segments areas of the queue 114 based on their priority (e.g., highest priority first).

The routing protocol module 112 communicates (block 224) signaling to the global RIB 132 to cause the global RIB 132 to delete all routes therein that correspond to routes in the stale route queue 116. The routing protocol module 112 then deletes (block 226) from the local RIB 120 all routes therein that correspond to routes in the stale route queue 116. The routing protocol module 112 then deletes (block 228) all routes remaining in the stale route queue 116, and moves (block 230) all routes from the fresh route queue 114 to the stale route queue 116.

In this manner, the stale route queue 116 is used to keep track of stale routes that are no longer reachable or viable and which need to be removed from the local RIB 120 and the global RIB 132. The stale route queue 116 starts each route computation cycle with a copy of all routes that were determined in a previous route computation cycle. Each route determined in the present route computation cycle is removed from the stale route queue 116 and placed on the fresh route queue 114, so that at the end of the present route computation cycle the stale route queue 116 only contains stale routes. Each of the stale routes can then be removed from the local RIB 120 and the global RIB 132 in an efficient manner without requiring analysis of any of the new, changed, and unchanged, routes that are determined during the present route computation cycle. The new and changed routes that are determined during the present route computation cycle can also be efficiently added to the local RIB 120 and the global RIB 132 without undesirably adding stale routes from a previous computation cycle. The improved efficiency of the route computation cycle can be proportional to the routing table size.

FIG. 3a illustrates an example old routing table from a previous routing computation cycle, and FIG. 3b illustrates an example new routing table from a present routing computation cycle. The old routing table contain six route entries, "a", "b", "c", "d", "e", and "f". A topology change has occurred since the old routing table was computed, so that the new routing table has a changed route "b" (indicated by the square) and route "f" has become unreachable (indicated by Its absence from the table).

FIG. 4 illustrates a diagram of operations and associated information flows that may be performed by the network element 100 of FIG. 1 to manage the routes in the local RIB 120 and the global RIB 132 responsive to change from the old routing table of FIG. 3a to the new routing table of FIG. 3b. The stale route queue 116 starts the new routing computation cycle containing (400) the six route entries, "a", "b", "c", "d", "e", and "f". The routing protocol module 112 determines (402) routes "a", "b", "c", "d", and "e" from the present link state information.

Routes "a", "c", "d", and "e" are determined to be unchanged from corresponding entries in the stale route queue 116 and, therefore, are added (404) to the fresh route queue 114 and marked as unchanged. Route "b" is determined to be change from a corresponding entry in the stale route queue 116 and, therefore, it is added (404) to the fresh route queue 114 and marked as changed. Routes "a", "b", "c", "d", and "e" are deleted (406) from the stale route queue 116. Because route "b" as changed, route "b" is updated (408) in the local RIB 120 and is updated (410) in the global RIB 132.

All routes remaining in the stale route queue 116, which is only route "f", are deleted (412) from the local RIB 120 and are deleted (414) from the global RIB 132. All routes are then cleared (416) from the stale route queue 116. The routes "a", "b", "c", "d", and "e" are then moved (418) from the fresh route queue 114 to the stale route queue 116, so that the stale route queue 116 contains a copy of all of the routes "a", "b", "c", "d", and "e" that were computed during the present route computation cycle. When the routes "a", "b", "c", "d", and "e" are moved from the fresh route queue 114 to the stale route queue 116, they are deleted from the fresh route queue 114. Accordingly, no routes remaining in the fresh route queue 114 after the routes "a", "b", "c", "d", and "e" are moved to the stale route queue 116.

Figure 5:
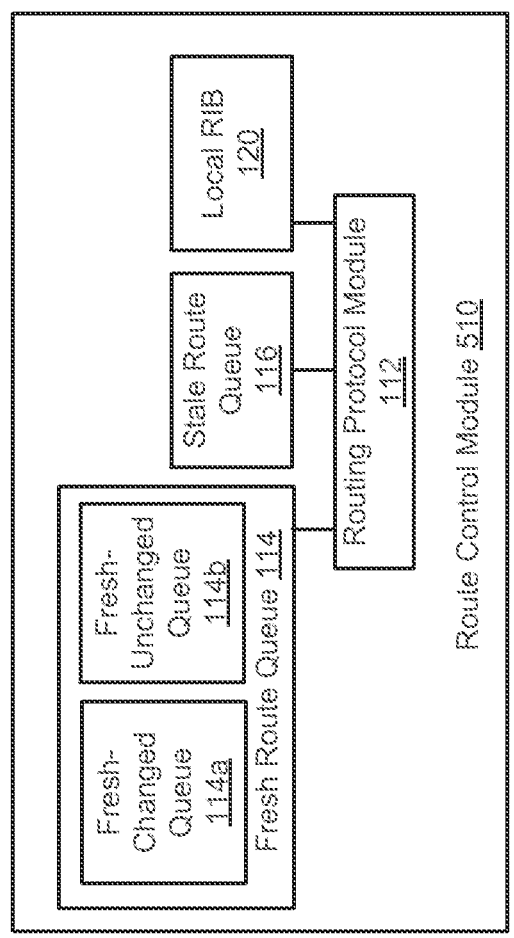
FIG. 5 is a block diagram of another embodiment of a route control module according to some embodiments.

FIG. 5 is a block diagram of another embodiment of a route control module 510 that can be used in place of one or more of the route control modules 110 of the network element 100 of FIG. 1. The route control module 510 of FIG. 5 has a divided fresh route queue 114, with a separate fresh-changed queue 114a and fresh-unchanged queue 114b. As routes are determined in a present route computation cycle, they can then be sorted and stored in one of the fresh-changed queue 114a, the fresh-unchanged queue 114b, or the stale route queue 116. Sorting the determine routes in this manner may further improve the computation of efficiency with which routes can be added, updated, and removed from the local RIB 120 and the global RIB 132.

Figure 6:
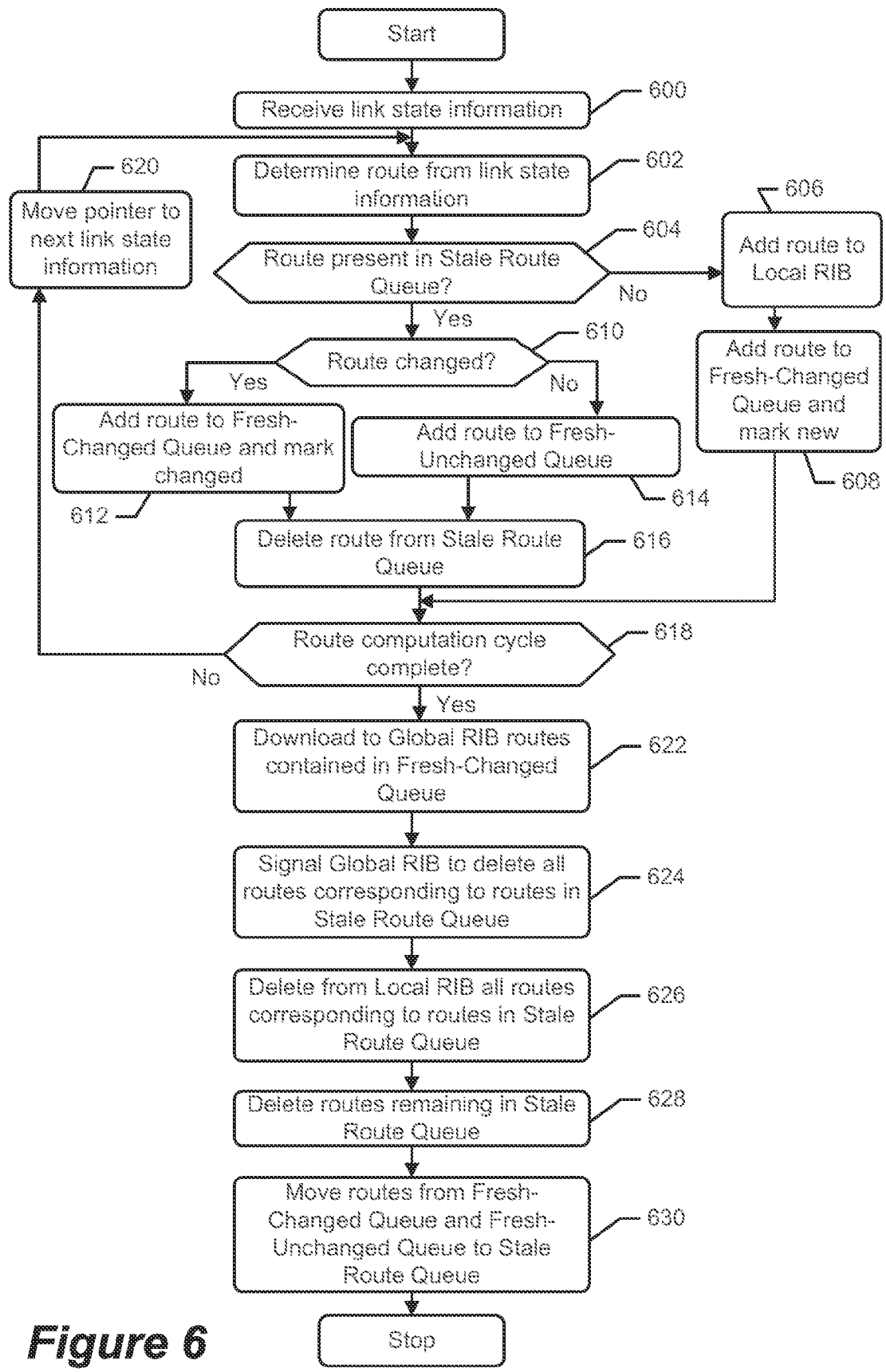
FIG. 6 illustrates a flowchart of some other operations and methods that may be performed by the route control module of FIG. 5 to manage routes in a local RIB and a global RIB of FIG. 1 using a divided fresh route queue according to some embodiments.

FIG. 6 illustrates a flowchart of some operations and methods that may be performed by the routing control module 510 of FIG. 5 to manage routes in local RIB 120 and the global RIB 132 of FIG. 1. Referring to FIG. 6, the routing protocol module 112 receives (block 600) link state information from peer network elements 100. The routing protocol module 112 determines (block 602) a route from the link state information. The stale route queue 116 initially contains all routes that were determined from a previous route computation cycle.

A determination is made (block 604) as to whether the route is in the stale route queue 116 and, if not, the routing protocol module 112 adds (block 606) the route to the local RIB 120. The route is also added (block 608) to the fresh-changed queue 114a and is marked therein as a new route.

When the route is determined (block 604) to be in the stale route queue 116, a further determination (block 610) is made as to whether the route has changed. When it has changed relative to the stale route queue 116, the route is added (block 612) to the fresh-changed queue 114a and is marked, therein as changed. In contrast, when the route has not changed, the route is added (block 614) to the fresh-unchanged queue 114b.

The route is then deleted (block 616) from the stale route queue 116. A determination (block 618) is made as to whether the route computation cycle is complete (e.g. all routes computed, from the link state information) and, if not, a pointer is moved (block 620) to the next link state information element and the cycle is repeated through blocks 602-616 as described above.

When the route computation cycle is complete, all of the routes in the fresh-changed queue 114a are downloaded (block 622) to the global RIB 132 via the global RIB module 130. The routing protocol module 112 communicates (block 624) signaling to the global RIB 132 to cause the global RIB 132 to delete all routes therein that correspond to routes in the stale route queue 116. The routing protocol module 112 then deletes (block 626) from the local RIB 120 all routes therein that correspond to routes in the stale route queue 116. The routing protocol module 112 then deletes (block 628) all routes remaining in the stale route queue 116, and moves (block 630) all routes from the fresh-changed queue 114a to the stale route queue 116 and moves (block 630) all routes from the fresh-unchanged queue 114b to the stale route queue 116. The routes may be moved from the fresh-changed queue 114a to the stale route queue 116 by moving the routes between memory locations or by defining the stale route queue 116 to include memory addresses containing the identified new routes and the Identified changed routes in the fresh-changed queue 114a.

In this manner, the stale route queue 116 is used to keep track of stale routes that are no longer reachable or viable and which need to be removed from the local RIB 120 and the global RIB 132. Each of the stale routes can then be removed from the local RIB 120 and the global RIB 132 in an efficient manner without requiring analysis of any of the new, changed, and unchanged routes that are determined during the present route computation cycle. Moreover, because the routes are sorted between the separate fresh-changed queue 114a and fresh-unchanged queue 114b, the new and changed, routes that are determined during the present route computation cycle can also be efficiently added to the local RIB 120 and the global RIB 132.

Figure 7:
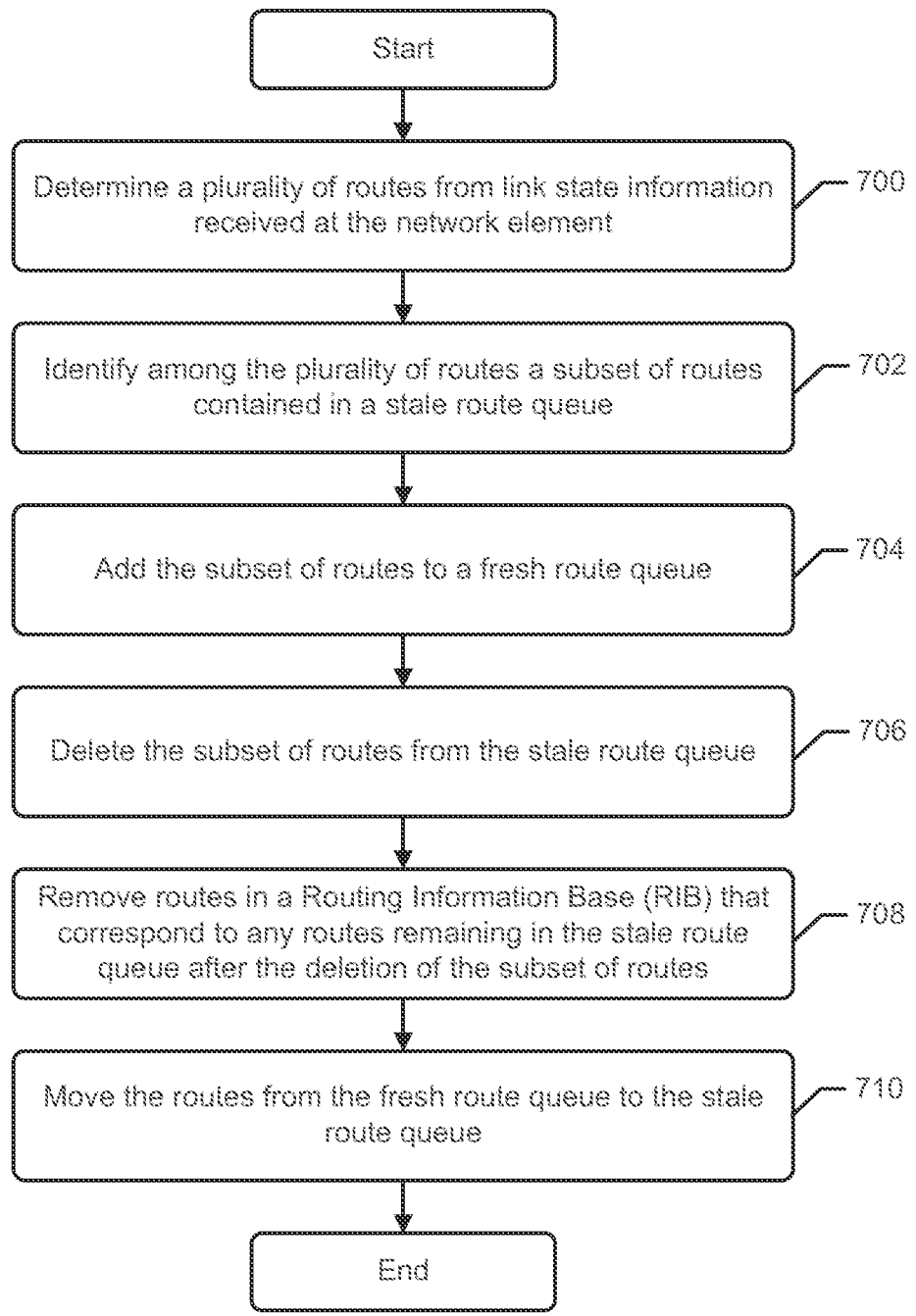
FIG. 7 illustrates a flowchart of more general operations and methods that may be performed by the network node of FIG. 1 to manage routes in a FIB according to some embodiments.

FIG. 7 illustrates a flowchart of more general operations and methods that may be performed by the network node 100 of FIG. 1 to manage routes in a RIB (e.g., the local RIB 120, the global RIB 132, and/or another RIB) according to some embodiments. Referring to FIG. 7, a plurality of routes are determined (block 700) from link state information that is received at the network element 100. A subset of routes are identified (block 702) among the plurality of routes contained in the stale route queue 116. The subset of routes are added (block 704) to the fresh route queue 114. The subset of routes are then deleted (block 706) from the stale route queue 116. The routes in the RIB that correspond to any routes remaining in the stale route queue 116 are then removed (block 708). The routes contained in the fresh route queue 114 are then moved (block 710) to the stale route queue 116. It is to be understood that the operations of blocks 704 and 706 can be implemented as a move operation by winch routes are deleted from the stale route queue 116 as they are added to the fresh route queue 114.

The operations and method disclosed herein for managing routes in a RIB may alternatively or additionally be used to download all of the determined routes to the local RIB 120 and/or the global RIB 132 responsive to, for example, RIB recovery after a RIB daemon death and birth event; Non-Stop Routing (NSR); graceful-restart; and/or a command line interface (CLI)-forced route clear. Downloading of all of the determined routes to the local RIB 120 and/or the global RIB 132 can be carried out by swapping the stale route queue 116 with the fresh route queue 114 to cause every route to be downloaded.

Figure 8:
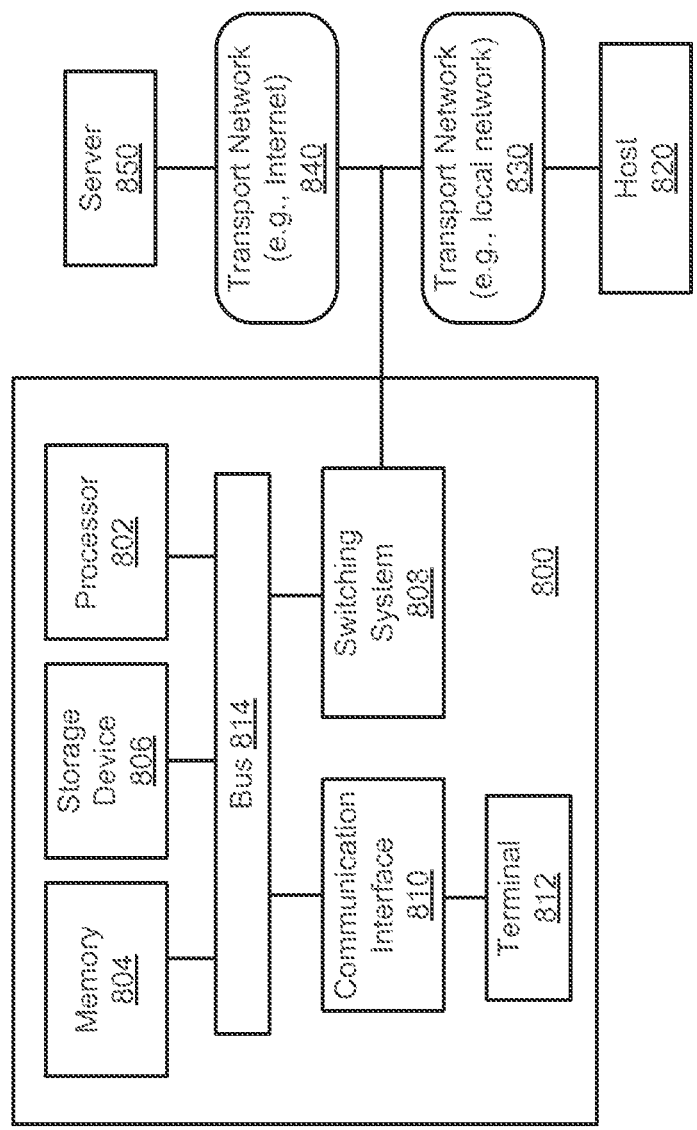
FIG. 8 is a block diagram of a communications network with a computer system that may implement the network element of FIG. 1 according to some embodiments.

FIG. 8 is a block diagram of a communications network with a computer system 800 that may implement the network element 100 of FIG. 1 according to some embodiments. Referring to FIG. 8, the computer system 800 includes a bus 814 or other communication mechanism for communicating information, and a processor 802 coupled with bus 814 for processing information. Computer system 800 also includes a main memory 804, such as a random access memory (RAM), flash memory, or other dynamic storage device, coupled to bus 814 for storing information and instructions to be executed by processor 802. Main memory 804 also may be used for storing temporary variables or other intermediate information during execution of instructions to be executed by processor 802. Computer system 800 can further include other storage device(s) 806, such as a magnetic disk, flash memory or optical disk, coupled to bus 814 for storing information and instructions.

A communication interface 810 may be coupled to bus 814 for communicating information and command selections to processor 802. Interface 810 may be a conventional serial interface such as an RS-232 or RS-422 interface. An external terminal 812 or other computer system connects to the computer system 800 and provides commands to it using the interface 810. Firmware or software running in the computer system 800 provides a terminal interface or character-based command interface so that external commands can be given to the computer system 800.

A switching system 808 is coupled to bus 814 and has an input interface and an output interface to one or more external network elements. The external network elements may include various transport networks, such a local network 830 coupled to one or more hosts 820, and the Internet or another global network 840 having one or more servers 850. The switching system 808 switches information packet traffic arriving on its input Interface to its output interface according to pre-determined protocols and conventions that are well known. For example, switching system 808, in cooperation with processor 802, can determine a destination of a packet of data arriving on the input Interface and send it to the correct destination using the output interface. The destinations may Include host 820, server 850, other end stations, or other routing and switching devices in local network 830 or Internet 840.

The processor 802 may include one or more data processing circuits, such as a general purpose and/or special purpose processor (e.g., microprocessor and/or digital signal processor). The processor 802 is configured to execute computer program instructions from functional modules in the memory 804 and/or storage device 806, described below as a computer readable medium, to perform some or all of the operations and methods that are described above for one or more of the embodiments, such as the embodiments of FIGS. 1-7. Accordingly, the processor 802 can be configured by execution of the computer program instructions in the functional modules to carry out at least some of the functionality described herein to manage routes in a RIB of a network element.

In the above explanation of exemplary embodiments of the invention, it is to be understood that, when a element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. In the description and appending drawings, like numbers refer to like elements throughout. Furthermore, "coupled", "connected", "responsive", or variants thereof as used herein may include wirelessly coupled, connected, or responsive. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be homed by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia." may be used to introduce or specify a general example or examples of a previously mentioned item, and is not intended to be limiting of such item. If used herein, the common abbreviation "i.e.", which derives front the Latin phrase "id est," may be used, to specify a particular item from a more general recitation.

Exemplary embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts anchor block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present invention. All such variations and modifications are intended to be included herein within the scope of the present invention, as set forth in the following claims.

What is claimed is:

1. A method for managing routes in a Routing Information Base (RIB) of a network element, the method comprising:
   determining a plurality of routes from link state information received at the network element;
   identifying a set of routes that are present in both the plurality of routes determined from the link state information and a stale route queue that contains routes that were known to exist before the determination of the plurality of routes from the link state information received at the network element;
adding all of the routes in the set of routes to a fresh route queue;
deleting all of the routes in the set from the stale route queue after all of the routes in the set are added to the fresh route queue;
removing routes in the RIB that match any routes remaining in the stale route queue after the deletion of all of the routes in the set from the stale route queue; and
moving all of the routes in the fresh route queue to the stale route queue after the deletion of all of the routes in the set from the stale route queue,
wherein the stale route queue and the fresh route queue are separate data storage queues in a memory.

2. The method of claim 1, wherein removing routes in the RIB that match any routes remaining in the stale route queue after the deletion of all of the routes in the set from the stale route queue, comprises:
removing routes in a local RIB and routes in a global RIB that correspond to any routes remaining in the stale route queue after the deletion of all of the routes in the set from the stale route queue.

3. The method of claim 2, further comprising:
performing the removal of the routes in the global RIB that correspond to any routes remaining in the stale route queue before performing the removal of the routes in the local RIB that correspond to any routes remaining in the stale route queue.

4. The method of claim 2, wherein:
the local RIB comprises routes generated by a single routing protocol module; and
the global RIB comprises routes generated by a plurality of routing protocol modules.

5. The method of claim 1, wherein after removing routes in the RIB that match any routes remaining in the stale route queue, the method further comprises:
deleting all routes remaining in the stale route queue; and
moving all of the routes in the fresh route queue to the stale route queue.

6. The method of claim 1, further comprising:
adding to the RIB any of the plurality of routes determined from the link state information that are not within the set of routes present in the stale route queue.

7. The method of claim 6, wherein adding to the RIB any of the plurality of routes determined from the link state information that are not within the set of routes present in the stale route queue comprises:
adding to the fresh route queue any of the plurality of routes determined from the link state information that are not within the set of routes present in the stale route queue;
identifying as new routes any of the routes in the fresh route queue that are not present in the stale route queue;
identifying as changed routes any of the routes in the fresh route queue that are different from corresponding routes in the stale route queue; and
adding the identified new routes and the identified changed routes from the fresh route queue to the RIB.

8. The method of claim 1, further comprising:
adding all of the routes in the RIB to a Forwarding Information Base (FIB); and
forwarding a data packet received by the network element to another network element responsive to one of the routes in the FIB.

9. The method of claim 1, wherein:
the fresh route queue comprises a fresh-changed queue and a fresh-unchanged queue;
identifying as new routes any of the plurality of routes determined from the link state information that are not present in the stale route queue;
adding the identified new routes to the fresh-changed queue;
identifying as changed routes any of the plurality of routes determined from the link state information that are different from corresponding routes in the stale route queue;
adding the identified changed routes to the fresh-changed queue;
identifying as unchanged routes any of the plurality of routes determined from the link state information that are the same as corresponding routes in the stale route queue;
adding the identified unchanged routes to the fresh-unchanged queue; and
adding the identified new routes and the identified changed routes from the fresh-changed queue to the RIB.

10. The method of claim 9, wherein moving all of the routes in the fresh route queue to the stale route queue comprises:
moving the identified new routes and the identified changed routes in the fresh-changed queue to the stale route queue; and
moving the identified unchanged routes in the fresh-unchanged queue to the stale route queue.

11. The method of claim 9, wherein moving all of the routes in the fresh route queue to the stale route queue comprises:
defining the stale route queue to include memory addresses containing the identified new routes and the identified changed routes in the fresh-changed queue.

12. A network element of a communications network, the network element comprising:
a fresh route queue;
a stale route queue;
a Routing Information Base (RIB);
a network interface configured to receive link state information from other network elements; and
a routing protocol module configured to:
determine a plurality of routes from the link state information;
identify a set of routes that are present in both the plurality of routes determined from the link state information and the stale route queue that contains routes that were known to exist before the determination of the plurality of routes from the link state information received at the network element;
add all of the routes in the set of routes to the fresh route queue;
delete all of the routes in the set of from the stale route queue after all of the routes in the set are added to the fresh route queue;
remove routes in the RIB that to match any routes remaining in the stale route queue after the deletion of all of the routes in the set of routes from the stale route queue; and
move all of the routes in the fresh route queue to the stale route queue after the deletion of all of the routes in the set from the stale route queue.

13. The network element of claim 12, wherein:
the RIB comprises:
a local RIB containing routes generated only by the routing protocol module; and
a global RIB containing routes generated by the routing protocol module and by at least one other routing protocol module; and the routing protocol module is further configured to remove routes in the local RIB and routes in the global RIB that correspond to any routes remaining in the stale route queue after the deletion of all of the routes in the set from the stale route queue.

14. The network element of claim 13, wherein:
the routing protocol module is further configured to remove the routes in the global RIB that correspond to any routes remaining in the stale route queue before removing the routes in the local RIB that correspond to any routes remaining in the stale route queue.

15. The network element of claim 12, wherein:
the routing protocol module is further configured, after removing routes in the RIB that correspond to any routes remaining in the stale route queue, to delete the routes remaining in the stale route queue and to move the routes in the fresh route queue to the stale route queue.

16. The network element of claim 12, wherein:
the routing protocol module is further configured to add to the RIB any of the plurality of routes determined from the link state information that are not within the set of routes present in the stale route queue.

17. The network element of claim 16, wherein the routing protocol module is further configured to add to the RIB any of the plurality of routes determined from the link state information that are not within the set of routes present in the stale route queue by:
  adding to the fresh route queue any of the plurality of routes determined from the link state information that are not within the set of routes present in the stale route queue;
  identifying as new routes any of the routes in the fresh route queue that are not present in the stale route queue;
  identifying as changed routes any of the routes in the fresh route queue that are different from corresponding routes in the stale route queue; and
  adding the identified new routes and the identified changed routes from the fresh route queue to the RIB.

18. The network element of claim 12, further comprising:
a Forwarding Information Base (FIB), wherein the routing protocol module is further configured to add all of the routes in the RIB to the FIB; and
a routing module configured to forward a data packet received through the network interface to another network element responsive to one of the routes in the FIB.

19. The network element of claim 12, wherein:
the fresh route queue comprises a fresh-changed queue and a fresh-unchanged queue; and
the routing protocol module is further configured to:
  identify as new routes any of the plurality of routes determined from the link state information that are not present in the stale route queue;
  add the identified new routes to the fresh-changed queue;
  identify as changed routes any of the plurality of routes determined from the link state information that are different from corresponding routes in the stale route queue;
  add the identified changed routes to the fresh-changed queue;
  identify as unchanged routes any of the plurality of routes determined from the link state information that are the same as corresponding routes in the stale route queue;
  add the identified unchanged routes to the fresh-unchanged queue; and
  add the identified new routes and the identified changed routes from the fresh-changed queue to the RIB.

20. The network element of claim 19, wherein:
the routing protocol module is further configured to move all of the routes in the fresh route queue to the stale route queue by defining the stale route queue to include memory addresses containing the identified new routes and the identified changed routes in the fresh-changed queue.

* * * * *